Patented Apr. 19, 1927.

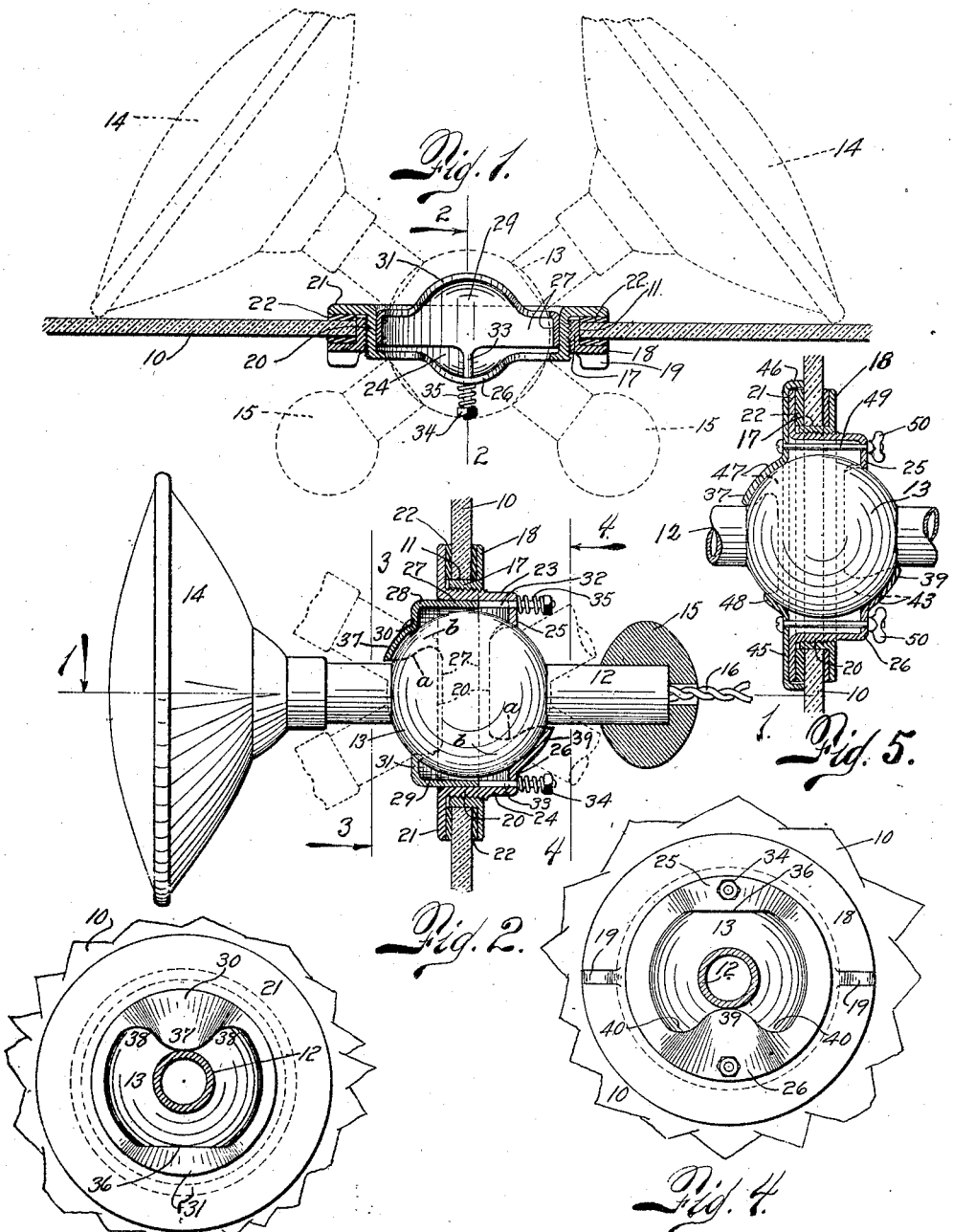

1,625,413

UNITED STATES PATENT OFFICE.

ROBERT R. FREUND, OF DENVER, COLORADO, ASSIGNOR, BY DIRECT AND MESNE ASSIGNMENTS, TO SHOT-LITE CORPORATION OF AMERICA, A CORPORATION OF COLORADO.

SPOT-LIGHT MOUNTING.

Application filed February 26, 1923. Serial No. 621,290.

This invention relates to means for adjustably supporting projector lanterns, and more particularly embodies improvements in spotlight mountings associated with the windshields of automobiles.

It has heretofore been proposed to mount a spotlight on the windshield of an automobile by cutting a substantial opening through the windshield, at an appropriate position, for the reception of a ball and socket support, through the ball of which a hollow arm extends with the light proper mounted thereon forwardly of the windshield while the inner end of said arm is disposed rearwardly thereof for the manipulation of the light from the inside of the automobile, the advantages of all of which are fully understood.

The ball in such cases has heretofore been customarily mounted by a pair of vertically disposed spaced disks that are suitably clamped to the windshield, forwardly and rearwardly thereof, in the zone of said opening therethrough. These disks are in fact flat rings, being substantially apertured centrally, and are generally formed with outturned inner peripheral flanges that extend in an uninterrupted path completely around the central apertures, to provide annular bearings which at all inner edge peripheral points contact the ball, for the seating of said ball all around with a limited universal play.

In such constructions, however, the lateral swing of the light is materially restricted, owing to the supporting arm for the light striking the said annular seating flanges or their equivalent, so that if it is desired to throw the light to an extreme side position, for ascertaining the number of a house or for other purposes, the automobile will have to be positioned a substantial distance to the rear of the object. Again, there is no restriction to the upward swing of the light excepting that of the said arm striking the annular bearing seats, but the ordinances of some large cities and the laws of some States at least prohibit the use of such a light that can be made to cast a beam above a horizontal plane when projected in a centrally forward direction, although it is permissible to project such a beam in a plane above the horizontal when the light is directed to one side of the central zone.

One of the primary objects of my invention has been to devise an improved separable and adjustable mounting for the ball, of a spotlight arrangement of this type, that embodies a forwardly located and a rearwardly located annulus member, relatively to the windshield, one of which annuli is provided with a pair of forwardly offset concave lips or bearing seats projected from its annulus proper, in diametrically opposed annularly spaced relation, and the other of which annuli is likewise provided with an analogous complementary pair of rearwardly offset concave lips or bearing seats projected from its annulus proper, in diametrically opposed annularly spaced relation, the said paired concave bearing lip seats of themselves alone seating said ball, without the ball being in contact with any other portion of the annuli members, and providing for wholly unobstructed clearance spaces extending annularly at both sides of said concave bearing lip seats, whereby maximum lateral swing of the lamp may be attained, being only limited by the lamp casing contacting the windshield, as distinguished from the lamp supporting arm engaging the annuli.

Another primary object of the improvements has been to provide suitable means whereby the forward end of the lamp supporting arm, and hence the light beams themselves, cannot be elevated above the horizontal when in central position, and when such a type of lamp control is requisite, although the forward end of the lamp supporting arm may be elevated above the horizontal when swung substantially to either side of the central position.

The foregoing as well as other objects and advantages, however, including simplicity and compactness in combined structure and comparatively small costs of production and installation, will be clearly apparent as incidental to the following disclosure, and with these prefacing remarks, therefore, reference will now be immediately had to the accompanying drawings, illustrating certain practical embodiments of the improvements, in which drawings—

Figure 1 is a horizontal sectional view, taken substantially along the line 1—1 of Figure 2, through a windshield and my improved mountings, with the ball, supporting arm and lamp shown in dotted outline in two laterally swung positions, but with the teat-like projections of Figure 2 omitted; Figure 2 is a vertical sectional view, taken substantially along the line 2—2 of Figure 1, with the lamp supporting arm, lamp and ball shown in full lines, in centralized position, and with the lamp supporting arm shown in dotted outline in two laterally and vertically swung positions, the view also showing more clearly teat-like projections on the forward upper and rearward lower concave bearing lip seats, either of which teat-like projections will prevent the elevation of the lamp arm support to a position above the horizontal when in centered position; Figure 3 is a cross-sectional view on the line 3—3 of Figure 2; Figure 4 is a cross-sectional view on the line 4—4 of Figure 2; and Figure 5 is a view substantially analogous to the ball mounting of Figure 2, but showing a modified form of the adjustable tension bearing element for the ball mounting.

Referring first more particularly to Figures 1 and 2, the numeral 10 indicates the windshield of an automobile, having a substantial opening 11 cut therethrough, while 12 designates a tubular arm extending through a ball support 13 and projecting forwardly and rearwardly thereof. The forward end of said tubular arm supports the spotlight 14 proper and the rear end of said arm may be provided with a suitable hand grip or its equivalent, illustrated by the knob 15, while 16 indicates electric conduit wires passing longitudinally through said tubular arm, in the circuit of which wires the incandescent lamp of the spotlight is included.

The opening 11 might be otherwise than circular, but it is preferably of circular form in order that it may be a drilled opening and also for receiving, in rotatable snug relation, the annular flange 17 of a centrally apertured disk or annulus 18 that may have means 19 (see Figs. 1 and 4) to take a spanner tool, if desired, for rotating the same within said opening for a purpose hereinafter appearing.

Associated with this laterally flanged ring 17—18 is a narrow annulus 20 that has a vertically disposed annular flange 21, which latter lies parallel to and is complemental of the flat ring element 18, in spaced relation, the parts 18 and 21 being adapted to provide clamping means on the inside and outside of the windshield 10 through the medium of interposed gaskets 22. The narrow annulus 20 fits within the lateral annular flange 17 in screwthreaded relation, so that by rotating the ring plate 18 in one direction the parts 18 and 21 are drawn towards each other, for clamping purposes, and when rotated in the opposite direction they are relatively forced apart for detachment from the windshield when and if desired, although these parts need not be disturbed if it be desired to simply remove the spotlight itself, with its tubular arm and ball support, for use as a trouble finder or for other inspection purposes, in which latter relations such spotlights are frequently employed, the range of use being limited only by the length of the lamp cord wires, of which there is always a surplus length as is understood.

At both the top and bottom of this narrow annulus 20, on the inside edge thereof or that edge opposite to the flange 21, there is formed an upper and a lower enlarged and somewhat concave lip, respectively indicated at 23 and 24, which enlarged lips are horizontally disposed and terminate, respectively with inturned flanges 25 and 26, struck on the arc of horizontal circles, with the opposed edge faces of said inturned flanges providing a pair of curving bearing seats for the upper and lower portions of the ball 13 that project rearwardly of the windshield, it being understood that these bearing seats and analogous ones for the forwardly projecting portion of the ball are the only bearings that the ball has, there being no side bearing flanges to limit the lateral swing of the arm 12, and hence the spotlight 14, as has hereinbefore been suggested.

In addition to the lateral annular flange 17, of the ring plate 18, which former for convenience may be referred to as the outer annulus, and in addition to the narrow annulus 20, which for convenience may be referred to as an intermediate annulus, in the structures of Figures 1 to 4, inclusive, there is a third ring or annulus that may conveniently be referred to as the inner annulus, and which will now be described in detail.

This narrow inner annulus is indicated at 27, fitting within the intermediate annulus 20, and at the top and bottom forward edge thereof there is formed an upper and a lower enlarged and somewhat concave lip, respectively indicated at 28 and 29, each of which enlarged lips are horizontally disposed and terminate with inturned flanges 30 and 31, struck on the arc of horizontal circles, with the opposed edge faces of their said inturned flanges providing a pair of curving bearing seats for the upper and lower portions of the ball 13 that project forwardly of the windshield. In other words, the bearing seats of the inner annulus 27 are similar to those of the intermediate annulus 20, and are complementally disposed with reference thereto and to each other.

From the rear edge of the inner annulus 20 there are projected an upper and a lower threaded tie-bolt pin 32—33, respectively, in line with the centers of said inturned flanges 25—26—30—31, which threaded tie-bolt or pins are adapted to extend through apertures in said inturned flanges 25—26 of the intermediate annulus, for the application of suitable securing nuts 34 and tension springs 35 interposed between the nuts and the inturned flanges 25—26 as will be apparent.

At Figure 2, all of the bearing edge seats of the inturned flanges 25—26—30—31, although having a curving bulge laterally, have flat edge faces, as would be indicated at 36 in Figures 3 and 4, but in some instances it may be desirable to limit the upward swing of the spotlight, when in central position, as has been heretofore suggested. To this end, at Figure 3, there is more clearly shown a downwardly projected central teat 37, embodying an extension of the inturned flange or concave bearing lip seat 30, which teat-like projection forms side recesses or pockets 38, so that the arm 12, and hence the light, cannot be caused to be elevated substantially above a horizontal plane, when in centralized position, although when moved to either side they may be tilted upwardly above the horizontal. This central teat 37 is shown as an extension of the upper forward inturned flange 30, but as shown at Figure 4 the same features may be disposed on the lower rearward inturned flange 26, as would be indicated by the numerals 39 and 40, or they may be formed on both of the aforesaid flanges.

The modification illustrated at Figure 5 differs from the structures previously described in that the particular inner annulus 27 is not employed, but in lieu thereof there is a forward annulus or ring plate 45, having an inwardly disposed peripheral flange 46 that encompasses the peripheral edges of the flange 21 and its gasket 22, which element 45 is provided with the upper and lower curving seats 47 and 48 respectively.

The upper bearing seat flange 25 of the annulus 20 is shown the same as that described with reference to Figure 2, while the lower bearing seat flange 26—39—43 of the annulus 20 is shown the same as that illustrated at 26—39—40 of Figure 4, but this is merely by way of general illustration and may be varied at will. Also the parts 47 and 48 may or may not be provided with the central teats 37 or 39, or both, as desired.

In this construction, the ring plate 45 and the upper and lower inturned flanges 25—26 are provided with registering apertures to receive adjusting tie-bolts 49, which are headed at one of their ends, and which may be threaded at their other ends to receive wing nuts 50, or their equivalent, although perhaps other suitable means might be employed for tightening up on or easing off on these tie bolts.

When the parts are assembled in position on the windshield as illustrated in Figures 1 to 4, it is obvious that, with the nut and spring arrangement 34—35, the tension on the ball may be adjusted to a nicety, so that while the ball 13, and hence the spotlight, will always be maintained steady in the position at which they are set, there is still sufficient resilient give to enable the driver of the automobile to adjust the light at any position with facileness and without turning the nuts back and forth. The same, and perhaps even a more satisfactory, resiliently tensioning adjustment is provided for in the structure of Figure 5, wherein the plate 45 has a springy resiliency inwardly from the position of the annulus 20, controlled by the tie bolts 49 and the wing nuts 50.

It may be again emphasized at this point that there are no side bearings for the ball to limit the lateral swing of the arm 12 in any of the structures illustrated, which is one of the most important features of the improvements, the ball having only the upper and lower sets of complementary concave lip bearing seats as heretofore described, which are transversely curved around the upper and lower portions of the ball but which do not extend vertically all around the forward and rearward portions of the ball, as in prior structures, the paired concave lip bearing seats being so offset from their supporting annuli proper as to provide for wholly unobstructed annular clearance spaces between said bearing seats at both sides thereof, as clearly seen from Figures 3 and 4, and the lateral swing of the spotlight being limited only by its casing when swung into contact with the windshield, which is more clearly shown perhaps at Figure 1.

Although I have shown and described the annulus or ring plate 18 as being provided with the lateral annular flange 17, it will be obvious that the internally threaded ring plate 18, without the lateral extension 17 thereof, would suffice for threaded attachment to the externally threaded annulus 20.

It may also be stated that, although for convenience of expression I have referred to the "tops and bottoms" of the annuli being provided with "upper and lower horizontally disposed" bearing seats, and so on, it is to be understood that these are their relative positions as properly applied to the windshield, but on the other hand they are as a matter of fact simply paired diametrically opposed bearing seats that so protrude rearwardly and forwardly, beyond the actual surfaces of the respective annuli, as to form wholly unobstructed annular clearance spaces therebetween.

From the foregoing complete description of the invention, it is believed that the novel utility and many advantages of the same will be clearly apparent, but, while I have thus fully set forth the improvements, it will nevertheless be understood that I do not confine myself necessarily to all of the details exactly as disclosed, excepting as they may come within the terms of the ensuing claims, and equivalent elements in combination, or as fairly interpreted in the light of the specification if requisite.

What I do claim, as new and patentable, is:—

1. The combination of an annulus adapted to be mounted within a suitably apertured support and provided with a pair of diametrically opposed bearing seats that so protrude rearwardly, in offset relation to the rear face of said annulus, as to form wholly unobstructed annular clearance spaces between and at both sides of said bearing seats, a second annulus provided with a pair of diametrically opposed bearing seats that so protrude forwardly, in offset relation to the front face of said second annulus, as to form wholly unobstructed annular clearance spaces between and at both sides of said last mentioned bearing seats, which forwardly protruding seats are complemental to said rearwardly protruding seats, a ball wholly mounted by and in contact only with all of said bearing seats, a projector light fixedly associated with said ball, and means for adjustably connecting said annuli under resilient tension.

2. The combination of an annulus adapted to be mounted within a suitably apertured support and provided with a pair of diametrically opposed bearing seats that so protrude rearwardly, in offset relation to the rear face of said annulus, as to form wholly unobstructed annular clearance spaces between and at both sides of said bearing seats, the said annulus being externally threaded and provided with a peripheral flange for location forwardly of said support, a ring plate for location rearwardly of said support and being internally threaded to engage and coact with said externally threaded annulus, for operating said ring plate and peripheral flange towards and away from said support, a second annulus provided with a pair of diametrically opposed bearing seats that so protrude forwardly, in offset relation to the front face of said second annulus, as to form wholly unobstructed annular clearance spaces between and at both sides of said last mentioned bearing seats, which forwardly protruding seats are complemental to said rearwardly protruding seats, a ball wholly mounted by all of said bearing seats, a projector light fixedly associated with said ball, and means for adjustably connecting said annuli.

3. The combination with an annulus adapted to be mounted within a suitably apertured support and provided with a pair of diametrically opposed bearing seats that so protrude rearwardly, beyond the rear face of said annulus, as to form wholly unobstructed annular clearance spaces therebetween, a second annulus provided with a pair of diametrically opposed bearing seats that so protrude forwardly, beyond the front face of said second annulus, as to form wholly unobstructed annular clearance spaces therebetween, which forwardly protruding seats are complemental to said rearwardly protruding seats, a ball mounted by said seats and having a forwardly projecting arm, a projector light mounted on said arm, an appropriate one of said bearing seats having a central inwardly projecting element adapted to engage said arm when the latter is in centralized position, to limit the upward swing of its forward portion, when in such position, but permitting of its further elevation when swung to either side thereof, and means for adjustably connecting said annuli.

4. The combination of an annulus adapted to be mounted within a suitably apertured support and having a pair of diametrically opposed bearing seats that so protrude rearwardly, in offset relation to the rear face of said annulus, as to form wholly unobstructed annular clearance spaces between and at both sides of said bearing seats, the said annulus being externally threaded and having a peripheral flange for location forwardly of said support, a ring plate for location rearwardly of said support and being internally threaded for operation on said externally threaded annulus, a second annulus comprising a forward ring plate having an inturned peripheral flange, for encompassing the aforesaid peripheral flange, and also having a pair of diametrically opposed bearing seats that so protrude forwardly, in offset relation to its front face, as to form wholly unobstructed annular clearance spaces between and at both sides of said last mentioned bearing seats, a ball mounted by said bearing seats, a projector light supported by said ball, and means for adjustably connecting said annuli.

5. The combination of an annulus adapted to be mounted within a suitably apertured support and provided with a pair of upper and lower horizontally protruding lips having inturned flanges, struck on the arcs of horizontal circles, which provide bearing seats with annular side clearance spaces therebetween, an annulus adjustably mounting a pair of upper and lower horizontally protruding lips having inturned flanges, struck on the arcs of horizontal circles, which provide bearing seats with annular side clearance spaces therebetween, which later lips, seats and clearance spaces are complemental to each other and to said first mentioned lips, seats and clearance spaces, a ball mounted by all of said seats, a projector light fixedly associated with said ball, and means for regulating the adjustment of said adjustable bearing seats, which means embody tie-bolts connected at one of their ends respectively to a complementary one of said adjustable bearing seats and at their other ends projected through apertures in said first mentioned inturned curving flanges, with means engaging the projected ends of said tie-bolts for tightening up and easing off on same.

6. The combination with an annulus adapted to be mounted within a circularly apertured support, said annulus being interiorly threaded and providing an external peripheral flange located at the rear of said support, of a second annulus that is externally threaded to fit within and engage the threads of said first mentioned annulus, the said second annulus providing an external peripheral flange located forwardly of said support and also having a pair of upper and lower horizontally disposed bearing seats, located rearwardly of said support and with annular side clearance spaces therebetween, and the said first mentioned annulus being rotatable to operate said peripheral flanges towards and away from said support, a third annulus mounting an adjustable pair of upper and lower horizontally disposed bearing seats, located forwardly of said support and with annular side clearance spaces therebetween, which forward bearing seats are complemental to each other and to said rearward bearing seats, a ball mounted by all of said bearing seats, a projector light fixedly associated with said ball, and means for regulating the adjustment of said forward bearing seats.

7. The combination of an annulus adapted to be mounted within a suitably apertured support and provided with a pair of upper and lower horizontally protruding lips having inturned flanges, struck on the arcs of horizontal circles, which provide bearing seats with annular side clearance spaces therebetween, an annulus adjustably mounting a pair of upper and lower horizontally protruding lips having inturned flanges, struck on the arcs of horizontal circles, which provide bearing seats with annular side clearance spaces therebetween, which latter lips, seats and clearance spaces are complemental to each other and to said first mentioned lips, seats and clearance spaces, a ball mounted by all of said seats and having a forwardly projecting arm, a projector light mounted on the forward end of said arm, an appropriate one of said bearing seats being provided with a central inwardly projecting element, adapted to engage said arm when the latter is in centralized position to limit the upward swing of the forward portion thereof substantially within a horizontal zone, when in said centralized position, but permitting it to be tilted above said horizontal zone when swung to either side of said centralized position, and means for regulating the adjustment of said adjustable pair of lips and their bearing seats.

In testimony whereof, I affix my signature.

ROBERT R. FREUND.